United States Patent [19]

Ueda

[11] Patent Number: 4,550,596
[45] Date of Patent: Nov. 5, 1985

[54] APPARATUS FOR INDICATING AN OPTIMUM SHIFT POSITION FOR A MANUAL TRANSMISSION INSTALLED IN A VEHICLE

[75] Inventor: Masahiro Ueda, Toyota, Japan

[73] Assignee: Toyota Jidosha Kabushiki Kaisha, Japan

[21] Appl. No.: 596,104

[22] Filed: Apr. 2, 1984

[30] Foreign Application Priority Data

Apr. 6, 1983 [JP]  Japan ................................. 58-60157
Apr. 6, 1983 [JP]  Japan ................................. 58-60158

[51] Int. Cl.⁴ .......................................... G01M 15/00
[52] U.S. Cl. ................................. 73/117.3; 364/424.1
[58] Field of Search ............... 73/117.3, 114; 364/551, 364/424.1, 431.04, 442; 340/52 R

[56] References Cited

U.S. PATENT DOCUMENTS 4,492,112  1/1985  Igarashi et al. ..................... 73/117.3
4,495,457  1/1985  Stahl ................................. 364/424.1

Primary Examiner—Stephen A. Kreitman
Attorney, Agent, or Firm—Parkhurst & Oliff

[57] ABSTRACT

An apparatus for instructing an operator to place a gearshift of a manual transmission in an optimum position in accordance with various operating parameters. An upshift zone is formulated and stored in a memory means and when operating conditions of the vehicle fall within the upshift zone, a plurality of timers begin counting for a predetermined amount of time and if operating conditions still fall within predetermined parameters, an upshift signal is issued. The apparatus recognizes if the engine is acting as a brake and if the engine is under a heavy load when accelerating and does not issue an upshift signal.

56 Claims, 10 Drawing Figures

APPARATUS FOR INDICATING AN OPTIMUM SHIFT POSITION FOR A MANUAL TRANSMISSION INSTALLED IN A VEHICLE

BACKGROUND OF THE INVENTION

The present invention relates to an apparatus for instructing an operator to displace a gearshift to its optimum shift position so that the gears in a manual transmission are located in an optimum position, and more particularly to an apparatus for instructing an operator to displace a gearshift to its optimum upshift position so that the gears in a manual transmission are located in an optimum position in accordance with various running conditions of the vehicle.

It has been proposed that to achieve minimum fuel consumption in a vehicle equipped with a manual transmission, an operator should determine when to shift the transmission in accordance with observed values from a speedometer or a tachometer. A proposed apparatus instructs an operator to upshift to an optimum gearshift position to achieve the goal of minimum fuel consumption. According to this proposed apparatus, an upshift zone is predetermined by the parameters of engine speed (RPM) and an engine load. The apparatus is designed to detect the engine speed and the engine load, and subsequently instruct an operator to shift the manual transmission to its optimum location by using an indicator means when the parameters of engine speed and engine load fall within the upshift zone. This upshift zone comprises an area where the actual engine speed is greater than a predetermined engine speed and the actual engine load is less than a predetermined engine load. An apparatus which uses the aforementioned upshift zone instructs the operator to upshift when the vehicle is started or when the vehicle is accelerating. Further, when the vehicle is decelerating or idling, the apparatus is designed to instruct an operator that an upshift would be improper. Additionally, when a throttle valve opens only slightly, the apparatus is designed to instruct an operator that an upshift is necessary.

However, the aforementioned apparatus has the following disadvantages. When a vehicle maintains a certain vehicle speed, such as when coasting on a gentle downhill grade, an engine brake may take effect to slow the vehicle, resulting in the throttle valve slightly opening. Hence, the apparatus detects the slight opening of the throttle valve and instructs the operator that the transmission should be upshifted even though the engine is acting as a brake for the vehicle.

Further, according to the aforementioned apparatus, an improper upshift instruction issues at other specific running conditions, such as when the load on the engine is large (created by, for example, the vehicle climbing an incline) or when the vehicle is accelerating. Additionally, when a stroke of an accelerator pedal temporarily decreases to lower the speed of the vehicle, the engine speed slowly decreases, but results in a rapid decrease of the engine load. This causes the apparatus to issue an upshift signal because the engine operating parameters are within the upshift zone. However, if an uphill incline was to continue, the upshift instruction would be improper.

SUMMARY OF THE INVENTION

The present invention was made in view of the foregoing background and to overcome the foregoing drawbacks. It is accordingly an object of this invention to provide an apparatus for instructing an operator to place a gearshift in an optimum position under various operating parameters including when the vehicle experiences a gentle downhill grade or when the vehicle is accelerating under a large engine load.

To attain the above objects, an apparatus according to the present invention instructs an operator to place a gearshift of a manual transmission in an optimum position in accordance with various operating parameters. An upshift zone is formulated by predetermined parameters of engine speed (RPM) and parameters representing engine load. The upshift zone is stored in a memory means. When operating parameters of the vehicle fall within the memorized upshift zone, a counter begins to count a predetermined amount of time from the time when the operating parameters first fall within the upshift zone. After the predetermined amount of time lapses, an indicator means instructs the operator to upshift the manual transmission if the actual operating parameters are still within the predetermined upshift zone.

BRIEF DESCRIPTION OF THE DRAWINGS

The above objects, features and advantages of the present invention will become more apparent from the following description of the preferred embodiments taken in conjunction with the accompanying drawings, wherein:

FIGS. 8, 8a and b are a detailed flow chart for determining when to issue an upshift instruction according to the second embodiment of the present invention.

DETAILED DESCRIPTION OF THE PREFERRED EMBODIMENTS

The present invention is described in detail with reference to the accompanying drawings which illustrate different embodiments of the present invention.

Figure 1:
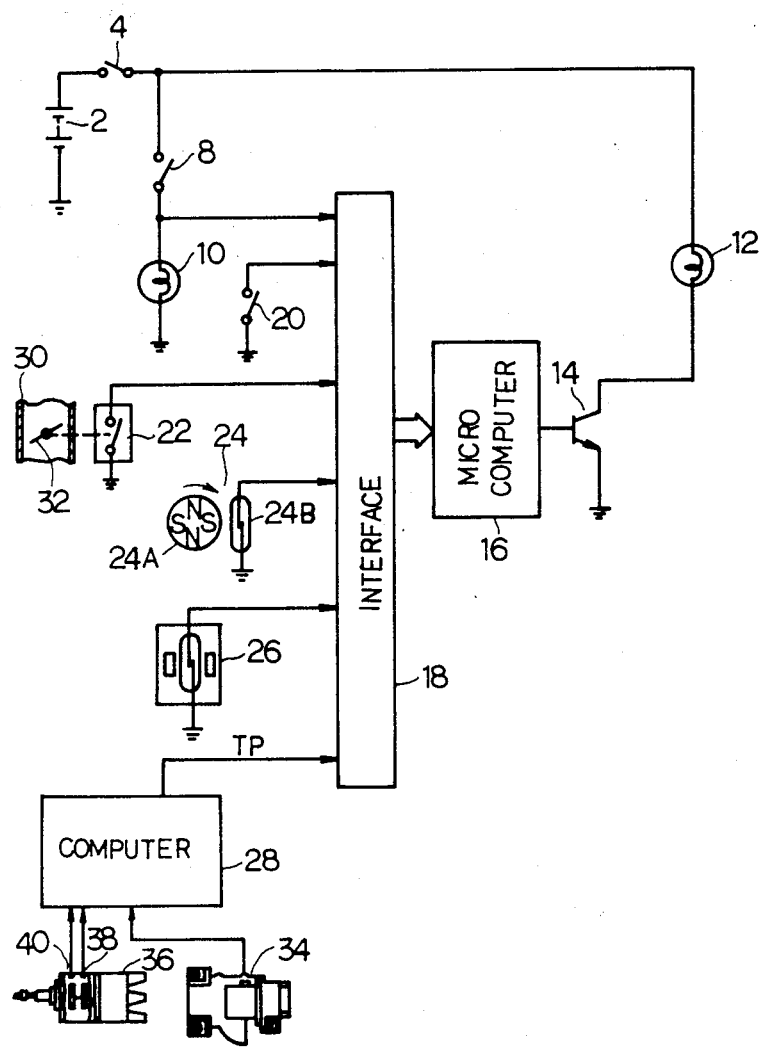
FIG. 1 is a schematic view of an electric circuit employed in an apparatus according to the present invention.

Referring to FIG. 1, a battery 2, which is installed as an electric power source in a vehicle, has a negative terminal connected with a ground in the vehicle and a positive terminal connected through an ignition switch 4, a reversing light lamp switch 8 and a reversing light lamp 10 to the ground of the vehicle. The reversing light lamp switch 8 is actuated by an operator selecting a reverse gear in a manual transmission installed in a vehicle. The ignition switch 4 is connected through an indicator lamp 12 to a collector of a transistor 14. An emitter of the transistor 14 is connected to an outlet port of a microcomputer 16. The microcomputer 16 calculates the proper time for shifting the manual transmission. The microcomputer 16 is connected with an interface 18 which outputs data into the microcomputer 16. The interface 18 is fed by at least six inputs, a first of which is connected with a point positioned between the reversing light lamp switch 8 and the reversing light lamp 10. A second input comes from a clutch switch 20, a third from an engine idle switch 22, a fourth from a vehicle speed sensor 24, a fifth from an engine coolant temperature switch 26 and a sixth from a computer 28, which electronically controls the fuel injection system.

The reversing light lamp switch 8 is mounted at a position adjacent to a gearshift lever (not shown in drawings) for the manual transmission, and is actuated when the shift lever is positioned in reverse gear. When the engine is running, and the reversing light lamp switch 8 is actuated, an ON signal is inputted through the battery 2, the ignition switch 4 and the reversing light lamp switch 8, to the interface 18. The clutch switch 20 is connected to the ground of the vehicle at one end thereof and to the interface 18 at another end thereof, when a clutch pedal (not shown in drawings) is depressed, the clutch switch 20 is actuated. The engine idle switch 22 is connected to the ground of the vehicle at one end thereof and to the interface 18 at another end thereof and is actuated when a throttle valve 32 mounted in a throttle body 30, is fully closed. The vehicle speed sensor 24 has a rotary magnet 24A and a lead switch 24B therein. The rotary magnet 24A is fixed to a speedometer cable (not shown in drawings). The lead switch 24B is connected to the ground of the vehicle and opens and closes four times for every revolution of the speedometer cable. The engine coolant temperature switch 26 is connected to the ground at one end thereof and is mounted within an engine cylinder block (not shown in drawings). The engine coolant temperature switch 26 is actuated when the engine coolant temperature is less than or equal to a predetermined temperature, for example, 50° C. The output from the engine coolant temperature switch 26 is fed into the interface 18.

Figure 2:
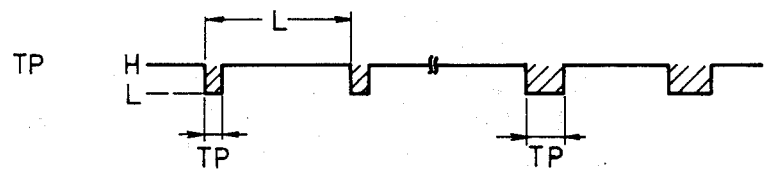
FIG. 2 is a diagrammatic view illustrating an electric pulse for controlling the amount of fuel injected into the engine.

An air flow meter 34, a first crank angle sensor 38 and a second crank angle sensor 40 are connected to the computer 28. The air flow meter 34 detects the amount of air suctioned into the engine. The first and second crank angle sensors 38 and 40 are provided on a distributor 36. The computer 28 calculates a basic amount of an injected fuel based upon the amount of air taken into the engine and the engine speed, and adjusts the basic amount of fuel injected into the engine, in accordance with the engine coolant temperature and the intake air temperature to obtain a final adjusted amount of fuel to be injected. The final adjusted amount of injected fuel is injected through a fuel injection valve, according to a pulse generated by the computer 28. The amount of fuel needed to be injected is determined by the pulse width generated by the computer 28. This fuel injection pulse controls the fuel injection valve per every predetermined crank angle. A pulse width signal (TP) for the fuel injection is inputted to the interface 18. The pulse width signal TP has a waveform such as that shown in FIG. 2. The pulse width is in approximate proportion to the amount of load experienced by the engine. An interval L between pulses is equivalent to a period for revolution of the engine. Hence, the load on the engine is small when a narrow pulse width is inputted and conversely, the load on the engine is large when a wide pulse width is inputted.

The microcomputer 16 includes a read-only memory (hereinafter referred to as ROM). The ROM has a memory which stores a map illustrating an upshift zone, such as the one shown in FIG. 3, specific gear ratios of the manual transmission and various other programs assisting in the operation of the vehicle.

Figure 3:
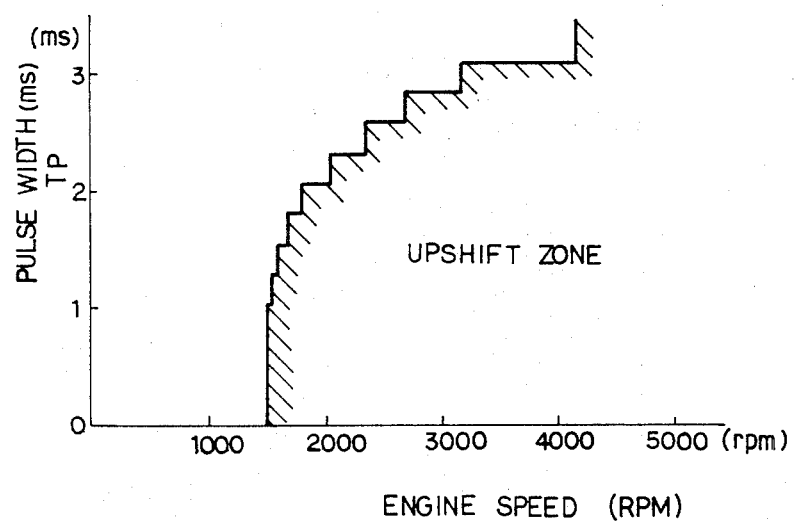
FIG. 3 is a diagrammatic view illustrating an upshift zone for a vehicle utilizing a manual transmission.

The upshift zone shown in FIG. 3, is determined by the engine speed (RPM) and the pulse width, which corresponds to the amount of load on the engine. The upshift zone is defined in an area where the engine speed is greater than or equal to 1500 RPM.

Figure 4:
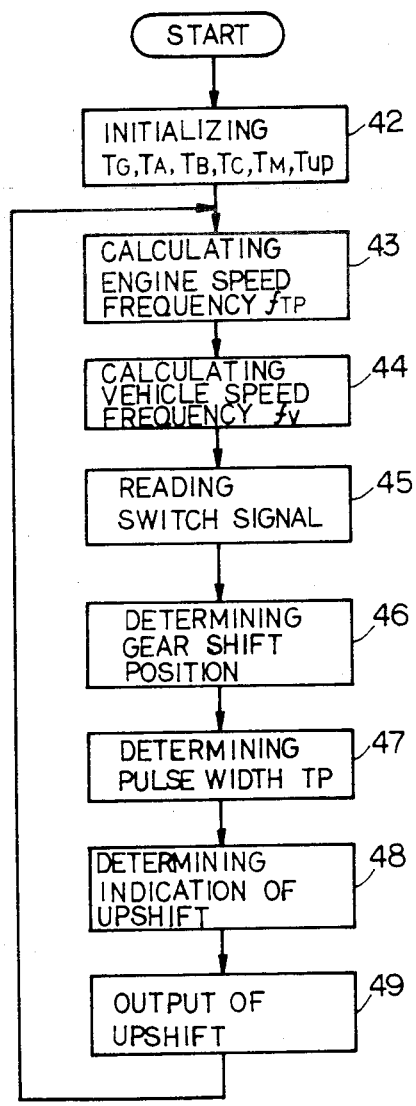
FIG. 4 is a flow chart of a main routine employed in the apparatus according to the present invention.
Figure 5:
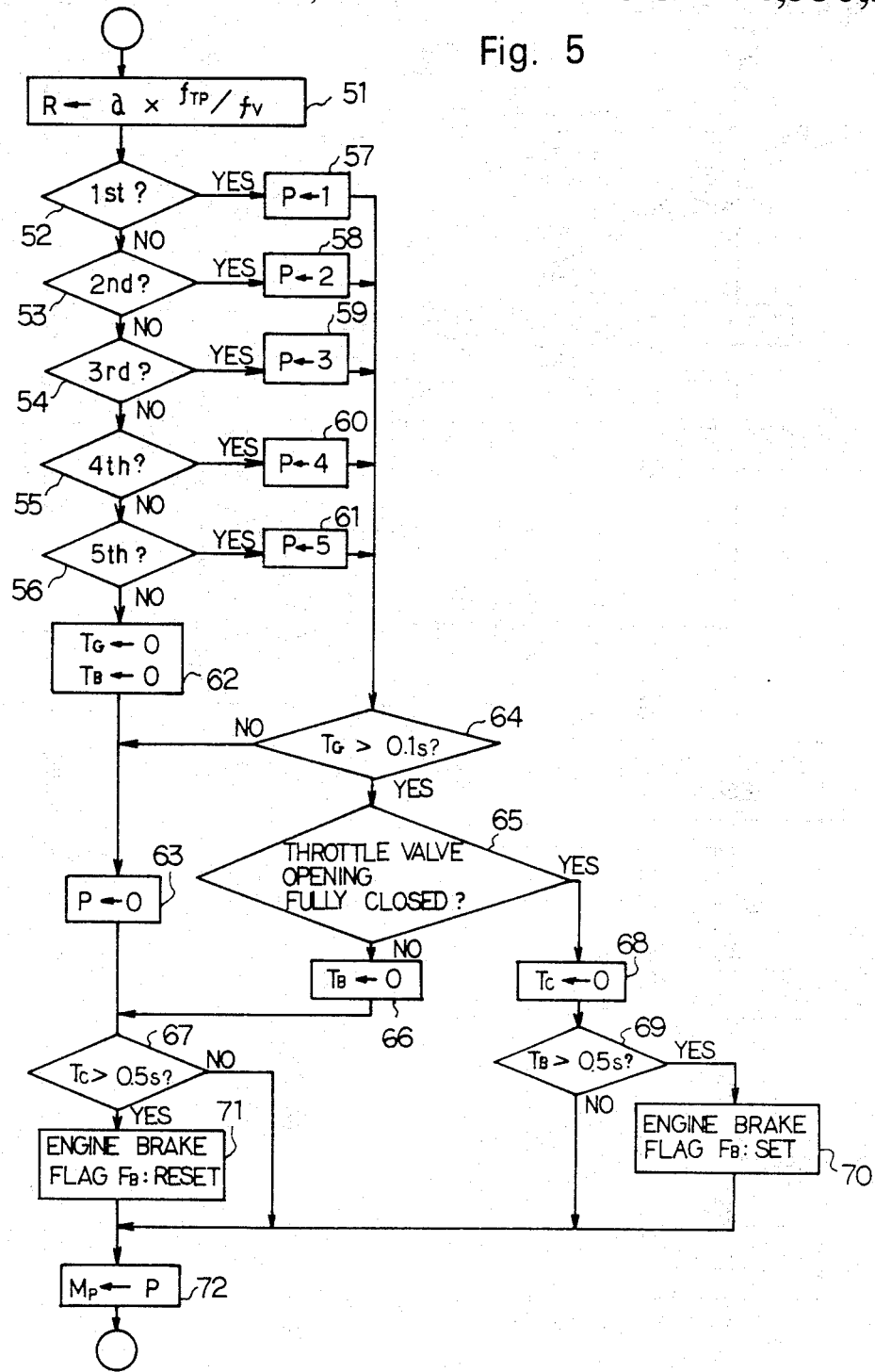
FIG. 5 is a detailed flow chart determining a gearshift position according to a first embodiment of the present invention.
Figure 6:
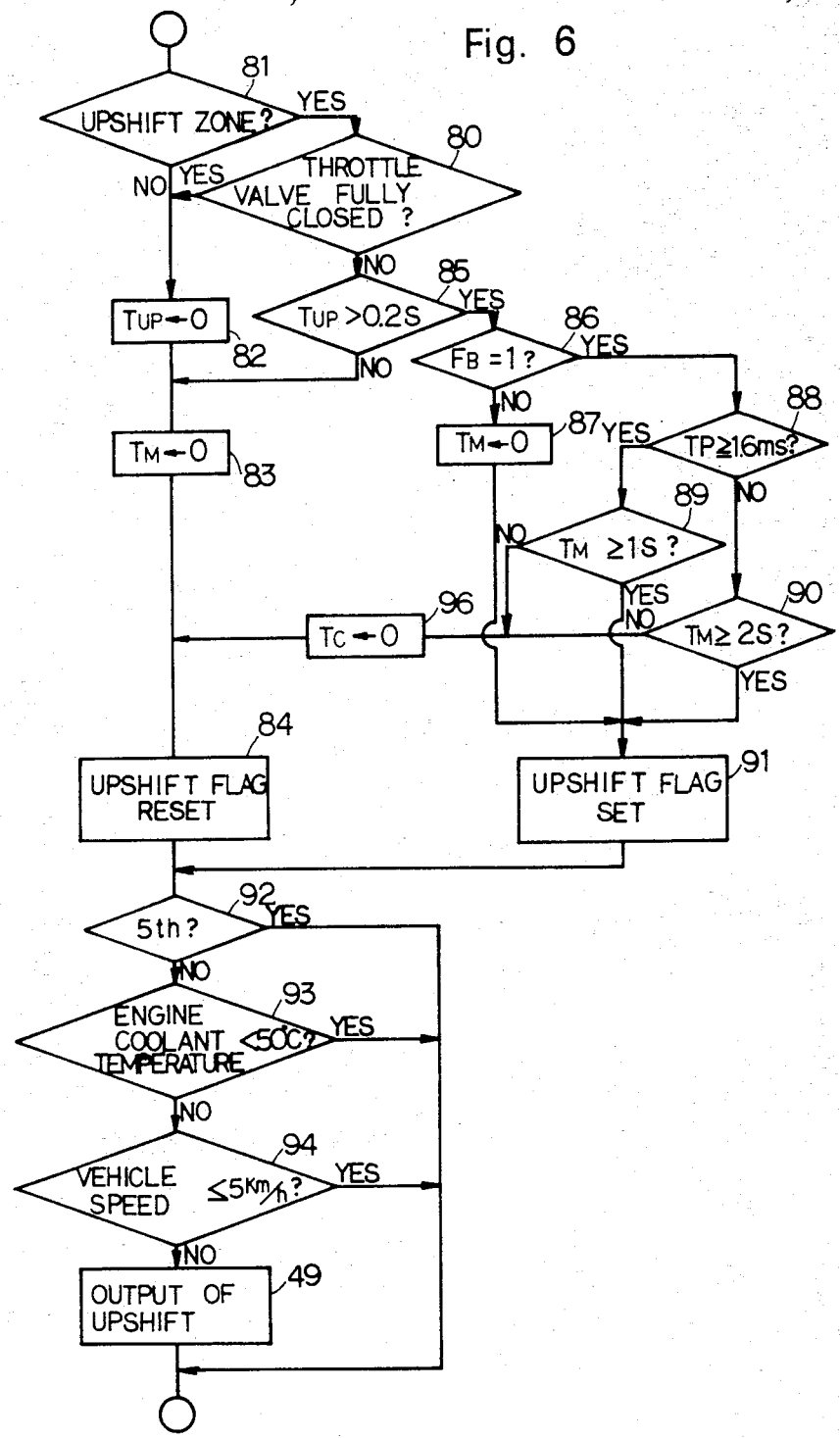
FIG. 6 is a detailed flow chart for determining when to issue an upshift instruction according to the first embodiment of the present invention.

FIG. 4 shows a main flow chart of a program employed in the first and second embodiments of the present invention. FIGS. 5 and 6 show flow charts of programs employed in the first embodiment of the present invention. In FIG. 4, a step 42 initiates various kinds of timers such as $T_G$, $T_A$, $T_B$, $T_C$, $T_M$ and $T_{up}$ upon the actuation of the ignition switch 4. The timer $T_G$ counts the amount of elapsed time from the moment when a gearshift position of a manual transmission is determined. The timer $T_A$ counts the amount of elapsed time from the moment when the vehicle commences to accelerate under a large engine load. The timer $T_B$ counts the amount of elapsed time from the moment when the throttle valve commences to be fully closed. When the throttle valve is fully closed, the engine brake is effected. The timer $T_C$ counts the amount of elapsed time from the moment when the engine brake is released. The timer $T_M$ counts the amount of elapsed time from the moment when the throttle valve commences to be opened from the fully closed position within the upshift zone. The timer $T_{up}$ counts the amount of time that the operative parameters of the vehicle place the manual transmission in the upshift zone.

The program then proceeds to a step 43, wherein the frequency $f_{TP}$ of the engine speed is calculated from the interval between consecutive TP signal pulses. The program proceeds to a step 44, wherein the frequency $f_v$ of the vehicle speed signal is calculated by counting the pulse signal of the vehicle speed sensor 24. The program then proceeds to a step 45, wherein the ON or OFF signal from the reversing light lamp switch 8, the clutch switch 20, the engine idle switch 22 and the engine coolant temperature switch 26 are read. The program proceeds to a step 46, wherein the present gear ratio R of the manual transmission is calculated from the frequency $f_{TP}$ of the engine speed and the frequency $f_v$ of the vehicle speed signal. Further, the actual gear ratio is calculated and compared with the specific gear ratios stored in the memory of the ROM, and the position of the gearshift is determined. The program proceeds to a step 47, wherein the engine load is determined by measuring the width of the pulse signal TP, and the determination is made of whether the present driving condition is positioned within the upshift zone shown in FIG. 3, as determined by the measured pulse width. The program proceeds to a step 48, wherein the determination is made of whether the actual driving condition is located within the memorized upshift zone based on the frequency $f_{TP}$ of the engine revolution and the pulse width signal TP as was measured in the step 47. The frequency $f_{TP}$ of the engine revolution is equal to the engine speed. Further, the determination of whether an instruction to upshift the transmission should be made, and an upshift flag $F_{up}$ is either set or reset. The program proceeds to a step 49, wherein according to the condition of the upshift flag $F_{up}$, a high or low level signal is outputted to the transistor 14. When a high level signal is outputted to the transistor 14, a base electric current flows in the transistor 14 and the indicator lamp 12 is actuated. This indicator lamp 12 instructs the operator to upshift the manual transmission. Conversely, when a low level signal is outputted to the transistor 14, the base electric current does not flow in the transistor 14 and the indicator lamp 12 is not actuated.

FIG. 5 shows a detailed flow diagram of the functions performed in step 46 of FIG. 4 which determines the appropriate position for the gearshift. In a step 51, the gear ratio R is calculated by the following equation:

$$R = a \cdot (f_{TP}/f_V) \quad (1)$$

where, "a" is a contant

In steps 52 through 56, the calculated gear ratio R is compared with the specific gear ratios (1st through 5th) stored in the memory of the ROM. If the value of the calculated gear ratio R is within the predetermined permissible scope (for example, ±5%) of the stored specific gear ratios of the manual transmission, the actual gearshift position (one of 1st–5th) is stored in a register P in any one of the appropriate steps 57 through 61. Thus, when the value of the actual calculated gear ratio R is within the predetermined permissible scope, the gearshift position is determined.

If the position of the gearshift cannot be determined by the above-mentioned steps, the program proceeds to a step 62, wherein the timers $T_G$ and $T_B$ are reset to zero. The timer $T_G$ counts the amount of time elapsed from the moment when the gearshift position of the manual transmission is determined. The timer $T_B$ counts the amount of time elapsed from the moment when the throttle valve commences to be fully closed. The program proceeds to a step 63, wherein the value stored in the register P is converted to a predetermined value, for example, zero. When the register P is caused to store the predetermined value, this procedure means that the gearshift position has not been determined for the presently occurring driving conditions. However, when the gearshift position is determined by any one of the steps 57 through 61, the program proceeds to a step 64. In the step 64, the determination is made of whether or not the counted value of time on the timer $T_G$ is greater than a predetermined value (for example, 0.1 seconds). If the counted value of time on the timer $T_G$ is greater than the predetermined value, the program proceeds to a step 65, wherein the determination is made of whether or not the throttle valve is fully closed. When the throttle valve 32 is fully closed, the engine brake is effected. However, if the counted value of time on the timer $T_G$ is less than or equal to the predetermined value in the step 64, the program proceeds to the step 63, wherein the value stored in the register P is converted to a predetermined value, for example, zero. But, when the step 65 determines that the throttle valve 32 is at least partially open, the program proceeds to a step 66, wherein the timer $T_B$ is reset to zero. The program proceeds to a step 68, wherein the timer $T_C$, which counts the amount of elapsed time from the moment when the engine brake is released, is reset to zero. The program then proceeds to a step 69. In the step 69, it is determined whether or not the counted value of time on the timer $T_B$ is greater than a predetermined value, for example, 0.5 seconds. If the counted value of time on the timer $T_B$ is greater than the predetermined value, the program proceeds to a step 70. In the step 70, an engine brake flag $F_B$ is set. The engine brake flag $F_B$ is set in such condition that after a predetermined amount of time elapses after the gearshift position has been determined, and after a predetermined amount of time elapses with the throttle valve being fully closed for the entire period, it is determined that the effect of the engine acting as a brake has occurred. The program then proceeds to a step 72.

However, if the step 65 has determined that the throttle valve was not fully closed, it would have proceeded to a step 67. In the step 67, the determination is made of whether or not the counted value of time on the timer $T_C$ is greater than a predetermined value (for example, 0.5 seconds). If the counted value of time on the timer $T_C$ is greater than the predetermined value, the program proceeds to a step 71. In the step 71, the engine brake flag $F_B$ is reset. If the counted value of time on the timer $T_C$ is less than or equal to the predetermined value, the program proceeds to a step 72. In the step 72, the value of the register P is stored in a predetermined area $M_P$ of the RAM.

FIG. 6 discloses a detailed flow diagram of the functions performed in the step 48 of FIG. 4, according to the first embodiment, which determines whether the actual driving condition is located within the memorized upshift zone. In a step 81, it is determined whether actual present pulse width signal TP and the actual engine speed fall within the upshift zone shown in FIG. 3. If the present driving conditions do not fall within the upshift zone, the program proceeds to a step 82, wherein the timer $T_{up}$, which counts the amount of time that the operating parameters of the vehicle cause it to be in the upshift zone, is reset to zero. The program then proceeds to a step 83. In the step 83, the timer $T_M$, which counts the amount of elapsed time from the moment when the throttle valve 32 commences to be opened from the fully closed position within the upshift zone, is reset to zero and the program proceeds to a step 84. The timer $T_M$ is adjusted to count an amount of time elapsed from the moment when the throttle valve 32 is first opened from the fully closed position with the engine brake flag $F_B$ being set in the upshift zone. However, if the actual present driving conditions fall within the upshift zone, the program proceeds from the step 81 to a step 80. In the step 80, it is determined whether or not the throttle valve 32 is fully closed. If the throttle valve 32 is not fully closed, the program proceeds to a step 85. In the step 85, it is determined whether or not the counted value of time on the timer $T_{up}$ is greater than a predetermined value (for example, 0.2 seconds). If the counted value of time on the timer $T_{up}$ is less than the predetermined value, the program proceeds to a step 83. In the step 83, the timer $T_M$ is reset to zero and the program proceeds to a step 84. However, if the counted value of time on the timer $T_{up}$ is greater than the predetermined value, the program proceeds from the step 85 to a step 86. In the step 86, it is determined whether or not the engine brake flag $F_B$ is not equal to 1. If the engine brake flag $F_B$ is not equal to 1, the program proceeds to a step 87. In the step 87, the timer $T_M$ is cleared, and the program proceeds to a step 91. However, if the engine brake flag $F_B$ is equal to 1, the program proceeds to a step 88. In the step 88, it is determined whether or not the pulse width signal TP is greater than a predetermined value (for example, 1.6 milliseconds) at its upper limit of the upshift zone. If the pulse width signal TP is greater than or equal to the predetermined value at its upper limit thereof, the program proceeds to a step 89, wherein it is determined whether or not the counted value of time on the timer $T_M$ is greater than a first predetermined value (for example, 1 second). However, if the pulse width signal TP is less than the predetermined value at its upper limit of the upshift zone, the program proceeds from the step 88 to a step 90. In the step 90, it is determined whether or not the counted value of time on the timer $T_M$ is greater than or equal to a second predetermined value (for example, 2 seconds). The second predetermined value is larger than the first predetermined value. If it is determined that the counted value of time on the timer $T_M$ is less than the second predetermined value, in the step 90, the program proceeds to a step 96, wherein the value of the timer $T_C$ is reset to zero. The program proceeds from the step 96 to a step 84. In the step 84, the upshift flag $F_{up}$ is reset.

When the pulse width signal TP is narrow, this condition may mean that the operator has temporarily opened the throttle valve 32, while still maintaining the effect of the engine brake and the operator desires to maintain the effect of the engine brake. Conversely, when the pulse width signal TP is wide, this condition may means that the pedal has been depressed a large amount and the operator does not desire the effect of the engine brake any longer. Hence, the first predetermined value is designed to be smaller than the second predetermined value. When a short amount of time elapses from the condition when the throttle valve 32 is opened within the upshift zone, the upshift flag $F_{up}$ is reset.

The reason why the timer $T_C$ is cleared in the step 96 is to prohibit the engine brake flag $F_B$ from being lowered when the timer $T_M$ commences to count the amount of time when the value of the engine brake flag $F_B$ being equal to 1, and to recount the amount of time counted by the timer $T_C$ after the predetermined time has elapsed, and to lower the engine brake flag $F_B$ unless the throttle valve 32 is fully closed during 0.5 second time period.

In the step 91, the upshift flag $F_{up}$ is set. When the engine brake is not effected within the upshift zone, or when the predetermined time elapses with the throttle valve 32 open, the upshift flag $F_{up}$ is set. As apparent from the above-described explanation, the upshift flag $F_{up}$ does not set whenever the throttle valve 32 temporarily opens.

In a step 92, it is determined whether the present gearshift position is in the position of the highest gear ratio (for example, 5th position) in view of the gearshift position memorized in the predetermined area $M_P$ stored in the RAM. When the actual present gearshift position is not in the position of the highest gear ratio, the program proceeds to a step 93, wherein it is determined whether or not the detected engine coolant temperature is lower than a predetermined temperature (for example, 50° C.). If the engine coolant temperature is not lower than the predetermined temperature, the program proceeds to a step 94. In the step 94, it is determined whether or not the vehicle speed detected by the vehicle speed sensor is less than or equal to a predetermined speed (for example, 5 km/h). If the detected vehicle speed is greater than the predetermined speed, the program proceeds to the step 49. The rationale for providing the steps 92 through 94 is as follows: When the actual present gearshift position is in the position of the highest gear ratio in the step 92, the manual transmission cannot obtain any higher gearshift positions. When the vehicle speed is less than the predetermined speed, in the step 94, it becomes apparent that the present driving condition is not in the upshift zone, regardless of any other parameters which are calculated. Further, when the engine coolant temperature is lower than the predetermined temperature set in the step 93, it also is not proper to upshift the transmission because the engine coolant temperature is too low. According to the first embodiment, the instruction of the upshift is not made when the reversing light lamp switch 8 is actuated or when the clutch swing 20 is actuated, because an upshift would not be proper in either of these circumstances.

Figure 7:
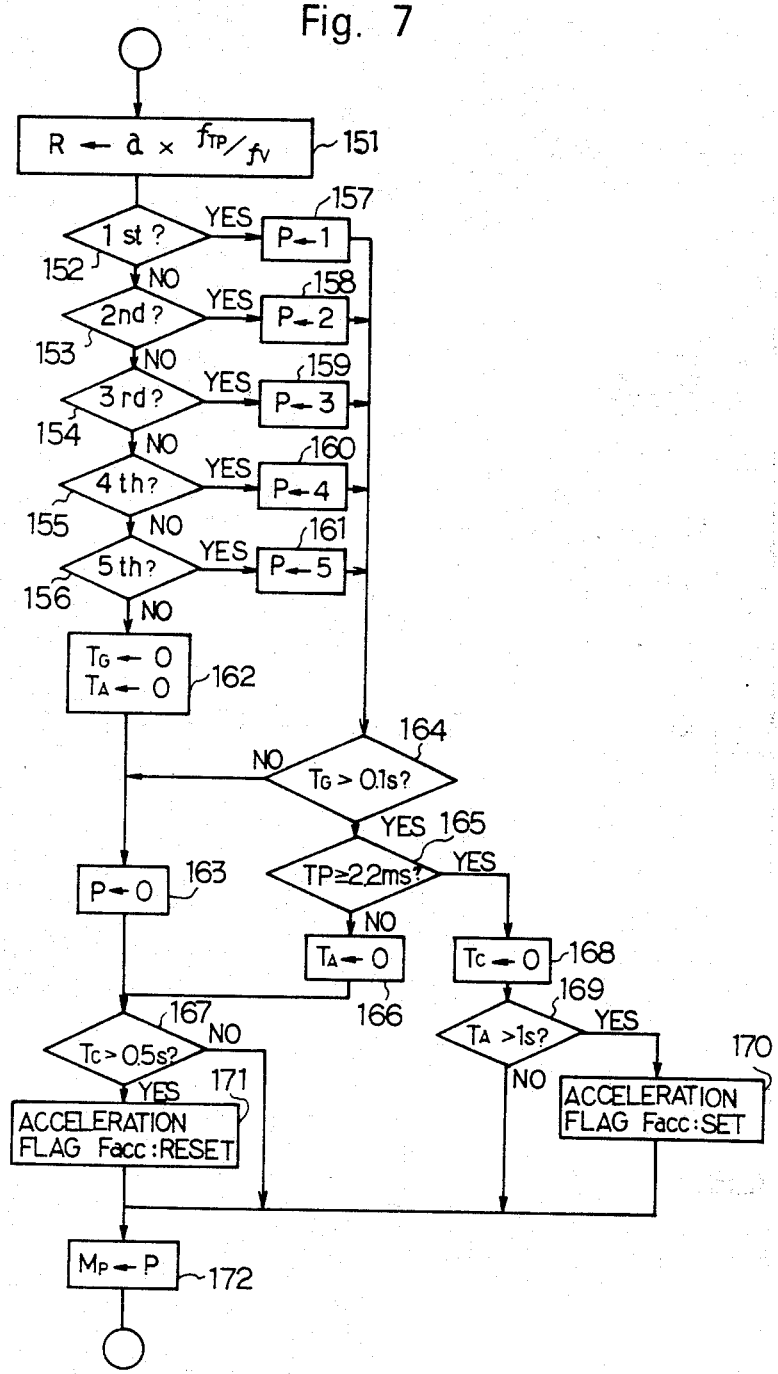
FIG. 7 is a detailed flow chart determining a gearshift position according to a second embodiment of the present invention.

FIG. 7 discloses a detailed flow diagram of the functions performed in the step 46 of FIG. 4, according to a second embodiment of the present invention, which determines the appropriate position for the gearshift. In a step 151, the gear ratio R is calculated by the steps shown in equation (1). In steps 152 through 156, the calculated gear ratio R is compared with the specific gear ratios (1st through 5th) stored in the memory of the ROM. If the calculated gear ratio R is a value within a predetermined permissible scope (for example, ±5%) of the specific gear ratios for the manual transmission stored in the actual ROM, gearshift position (one of the 1st–5th) is memorized in a register P in any one of the steps 157 through 161. Thus, when the calculated gear ratio R is a value within the predetermined permissible scope, the gear shift position is positively determined.

If the gearshift position is not positively determined by any of the above steps, the program proceeds to a step 162, wherein the timers $T_G$ and $T_A$ are reset to zero. The timer $T_G$ counts the amount of elapsed time from the moment when a gearshift position of the manual transmission is determined. The timer $T_A$ counts the amount of elapsed time from the moment when the vehicle commences to accelerate under a large engine load. The program then proceeds to a step 163. In the step 163, the value stored in the register P is converted to a predetermined value, for example, zero. When the register P is caused to store the predetermined value, this procedure means that the gearshift position has not been determined for the presently occurring driving conditions. However, when the gearshift position is determined by any one of the steps 157 through 161, the program proceeds to a step 164. In the step 164, the determination is made of whether or not the counted value of time on the timer $T_G$ is greater than a predetermined value (for example, 0.1 seconds). If the counted value of time on the timer $T_G$ is greater than the predetermined value, the program proceeds to a step 165. In the step 165, it is determined whether or not the pulse width signal TP is greater than a predetermined time (for example, 2.2 milliseconds). Because the pulse width signal TP is proportional to the load on the engine, the step 165 predetermines whether or not the engine load is greater than a predetermined value. If the counted value of time on the timer $T_G$ is less than or equal to the predetermined value in the step 164, the program proceeds to a step 163. If the pulse width signal TP is less than the predetermined value set forth in the step 165, the program proceeds to a step 166, wherein the timer $T_A$ is reset to zero. The program then proceeds to a step 167. When the determination is made in the step 165, that the pulse width signal TP is greater than or equal to the predetermined value, the program proceeds to a step 168. In the step 168, the timer $T_C$, which counts the amount of elapsed time from the moment when the engine brake is released, is reset to zero. The program proceeds to a step 169, wherein it is determined whether or not the counted value of time on the timer $T_A$ is greater than a predetermined value (for example, 1 second). If the counted value of the timer $T_A$ is greater than the predetermined value, the program proceeds to a step 170, wherein the acceleration flag $F_{acc}$ is set. The program then proceeds to a step 172. However, if the counted value of time on the timer $T_A$ is less than or equal to the predetermined value in the step 169, the program directly proceeds to the step 172 and by-passes the step 170.

In the step 167, which can be reached after either of the steps 163 or 166, the determination is made of whether or not the amount of time on the timer $T_C$ is greater than a predetermined value (for example, 0.5 seconds). If the counted amount of time on the timer $T_C$ is greater than the predetermined value, the program proceeds to a step 171. In the step 171, the acceleration flag $F_{acc}$ is reset. If the amount of counted time on the timer $T_C$ is less than or equal to the predetermined value, the program proceeds to a step 172, wherein the value of the register P is stored in the predetermined area $M_P$.

Figure 8:
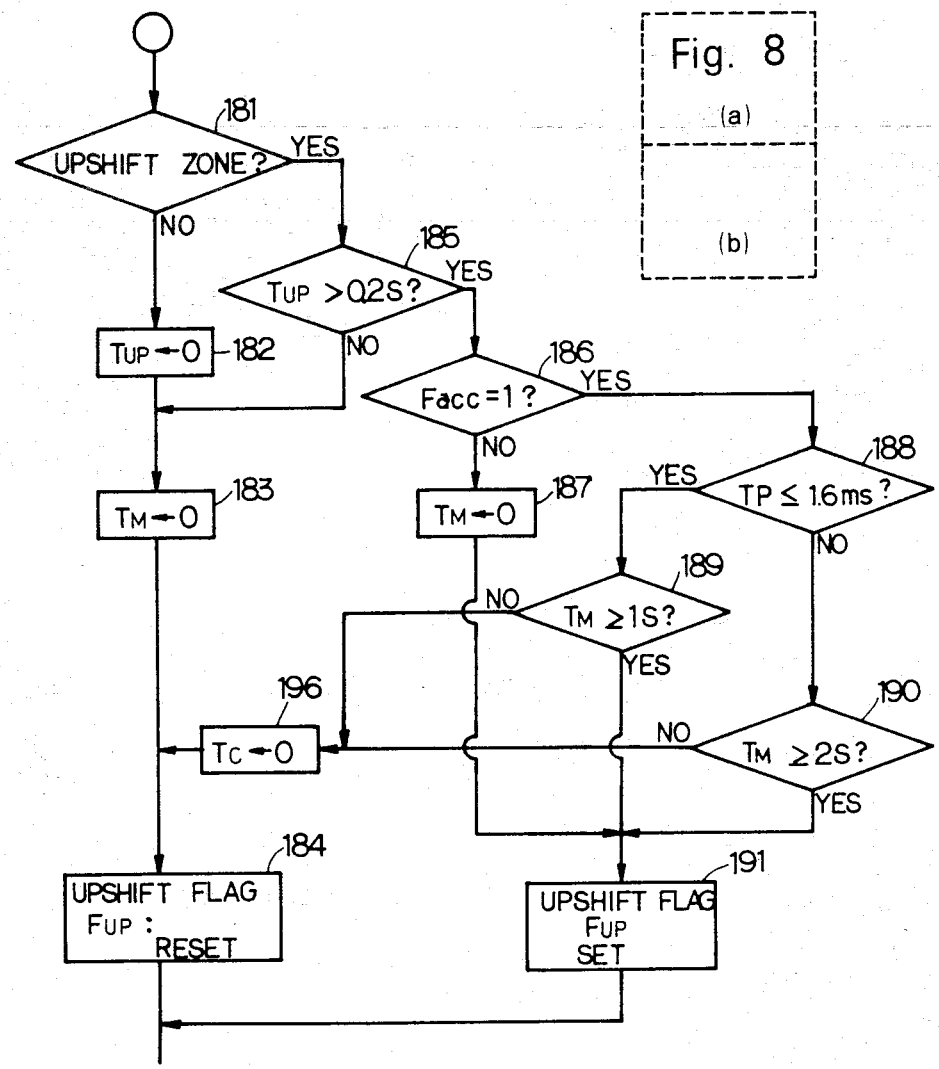
Figure 8:
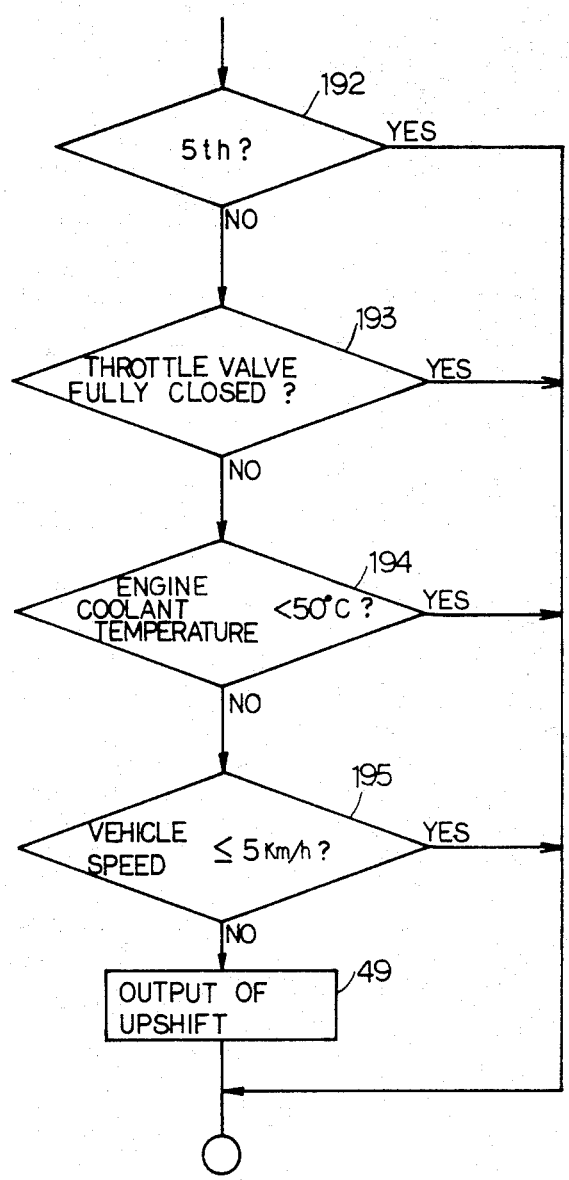

FIG. 8 discloses a detailed flow diagram of the functions performed in the step 48 of FIG. 4, according to the second embodiment, which determines whether the actual driving condition is located within the memorized upshift zone. In a step 181, it is determined whether the actual present pulse width signal TP and the actual engine speed fall within the upshift zone shown in FIG. 3. If the present driving conditions do not fall within the upshift zone, the program proceeds to a step 182, wherein the timer $T_{up}$, which counts the amount of time that the operating parameters of the vehicle cause it to be in the upshift zone, is reset to zero. The program then proceeds to a step 183. In the step 183, the timer $T_M$, which counts the amount of elapsed time from the moment when the throttle valve 32 commences to be opened from the fully closed position within the upshift zone, is reset to zero and the program proceeds to a step 184. The timer $T_M$ is adjusted to count an amount of time elapsed from the moment when the throttle valve 32 is first opened from the fully closed position with the engine brake flag $F_B$ being set in the upshift zone. However, if the actual present driving conditions fall within the upshift zone, the program proceeds from the step 181 to a step 185. In the step 185, it is determined whether or not the amount of time counted on the timer $T_{up}$ is greater than a predetermined value (for example, 0.2 seconds). If the counted amount of time on the timer $T_{up}$ is less than or equal to the predetermined value, the program proceeds to a step 183. However, if the counted value of the timer $T_{up}$ is greater than the predetermined value, the program proceeds from the step 185 to a step 186. In the step 186, it is determined whether or not the amount of the acceleration flag $f_{acc}$ is equal to 1. If the amount of the acceleration flag $F_{acc}$ is not equal to 1, the program proceeds to a step 187. In the step 187, the timer $T_M$ is reset to zero and the program proceeds to a step 191. If the amount of the acceleration flag $F_{acc}$ is equal to 1, the program proceeds from the step 186 to a step 188. In the step 188, it is determined whether the pulse width signal TP is less than or equal to a predetermined value (for example, 1.6 milliseconds) at an upper limit of the upshift zone. If the pulse width signal TP is less than or equal to the predetermined value at the upper limit of the upshift zone, the program proceeds to a step 189. In the step 189, it is determined whether or not the counted value of time on the timer $T_M$ is greater than a first predetermined value (for example, 1 second). If the pulse width signal TP is greater than the predetermined value at its upper limit of the upshift zone, the program proceeds from the step 188 to a step 190. In the step 190, it is determined whether or not the counted value of the time on the timer $T_M$ is greater than or equal to a second predetermined value (for example, 2 seconds). The second predetermined value is greater than that of the first predetermined value. If it is determined that the counted value of the amount of time on the timer $T_M$ is less than the second predetermined value, in the step 190, the program proceeds to a step 196. In the step 196, the timer $T_C$ is reset to zero. The program proceeds from the step 196 to a step 184, wherein the upshift flag $F_{up}$ is reset. When the counted value of the amount of time on the timer $T_M$ is small, this indicates that the acceleration stage is temporarily cleared. Further, in this condition, the operator may want to continue the vehicle in the acceleration stage. This varies in accordance with the pulse width signal TP which corresponds to the load experienced by the engine. The greater the engine load the greater the possibility of the fact that a vehicle is accelerating. When the pulse width signal is large, the counting time is adjusted to be of a longer duration than when the pulse width signal is short. When the vehicle speed is temporarily decreased within the area of the upshift zone, the upshift flag $F_{up}$ is reset. The reason why the timer $T_C$ is reset to zero in the step 196 is to prohibit the acceleration flag $F_{acc}$ from being lowered when the timer $T_C$ commences to count the time at the condition $F_{acc}=1$, and recounts the timer $T_C$ after the predetermined time has elapsed, and to lower the acceleration flag $F_{acc}$, unless the pulse width signal TP becomes greater than or equal to 5 milliseconds during a predetermined time. In the step 191, the upshift flag $F_{up}$ is set. As apparent from the above-described explanation, the upshift flag $F_{up}$ is not set even if the vehicle is in the upshift zone because the acceleration of the vehicle is lowered by a temporarily large engine load.

In a step 192, it is determined whether the present gearshift position is in the highest gear ratio (for example, 5th position) in view of the gearshift position of the predetermined area $M_P$ stored in the RAM. When the present gearshift position is not the position of the highest gear ratio, the program proceeds to a step 193. In the step 193, it is determined whether or not the throttle valve 32 is fully closed. If the throttle valve 32 is not fully closed, the program proceeds to a step 194. In the step 194, it is determined whether or not the engine coolant temperature is less than a predetermined temperature (for example, 50° C.). If the engine coolant temperature is not less than the predetermined temperature, the program proceeds to a step 195. In the step 195, it is determined whether or not the vehicle speed detected by the vehicle speed sensor is less than or equal to a predetermined speed (for example, 5 Km/h). If the detected vehicle speed is less than or equal to the predetermined speed, the program proceeds to the step 49, equivalent to the step 49 in FIG. 4. The rationale for providing the steps 192 through 195 is as follows: When the actual present gearshift position is the position of the highest gear ratio in the step 192, the manual transmission cannot obtain any higher gearshift positions. When the throttle valve is fully closed, the engine is idling and therefore it is not proper to upshift the gears of the manual transmission. Further, when the engine coolant temperature is less than the predetermined temperature, it also is not proper to upshift the transmission because the engine coolant temperature is too low. When the vehicle speed is less than the predetermined speed, in the step 195, it becomes apparent that the present driving condition is not in the upshift zone, regardless of any other parameters which are calculated.

According to the present second embodiment, the instruction of the upshift is not made when the upshift is not proper in such circumstances.

While the present invention has been described in its preferred embodiments, it is to be understood that the invention is not limited thereto, and may be otherwise embodied within the scope of the following claims.

What is claimed is:

1. An apparatus for indicating an optimum gearshift position for a manual transmission installed in a vehicle, comprising:
    an engine speed sensor for detecting a speed of an engine;
    an engine load sensor for detecting a load on an engine;
    memory means for storing parameters of engine speed and parameters representing engine load for creating an upshift zone;
    comparison means for determining whether the detected speed of the engine and the detected load on the engine fall within the stored parameters of engine speed and engine load which create the upshift zone;
    timing means for measuring a predetermined amount of elapsed time when the detected speed of the engine and the detected load on the engine fall within the stored parameters of engine sped and engine load which create the upshift zone;
    indication means for instructing that upshifting is necessary when the detected speed of the engine and the detected load on the engine fall within the stored parameters of engine speed and engine load which create the upshift zone; and
    delay means for delaying the instructing by the indication means that upshifting is necessary until the detected speed of the engine and the detected load on the engine have been within the stored parameters of engine speed and engine load, which create the upshift zone, for a predetermined amount of time.

2. The apparatus of claim 1, wherein said parameters representing engine load are generated by a fuel injection pulse which controls a fuel injection valve, the fuel injection pulse having a width which is proportional to a load on the engine.

3. The apparatus of claim 1, wherein said indication means comprises a lamp.

4. The apparatus of claim 1, wherein said delay means comprises a timer.

5. An apparatus for indicating an optimum gearshift position for a manual transmission installed in a vehicle, comprising:
    an engine speed sensor for detecting a speed of an engine;
    an engine load sensor for detecting a load on an engine;
    throttle means for controlling an amount of fuel supplied into an engine;
    timing means for counting an amount of elapsed time from a moment when the throttle means is fully closed;
    memory means for storing parameters of engine speed and parameters representing engine load for creating an upshift zone;
    comparison means for determining whether the detected speed of the engine and the detected load on the engine fall within the stored parameters of engine speed and engine load which creates the upshift zone;
    indication means for instructing that upshifting is necessary when the detected speed of the engine and the detected load on the engine fall within the stored parameters of engine speed and engine load which create the upshift zone; and
    delay means for delaying the instructing by the indication means that upshifting is necessary until the detected speed of the engine and the detected load on the engine have been within the stored parameters of engine speed and engine load, which create the upshift zone, for a predetermined amount of time.

6. The apparatus of claim 5, wherein said parameters representing engine load are generated by a fuel injection pulse which controls a fuel injection valve, the fuel injection pulse having a width which is proportional to a load on the engine.

7. The apparatus of claim 5, wherein said indication means comprises a lamp.

8. The apparatus of claim 5, wherein said delay means comprises a timer.

9. A method for indicating an optimum time to upshift a manual transmission installed in a vehicle having an engine comprising the steps of:
    storing a plurality of optimum upshift conditions;
    actuating a plurality of timers for counting predetermined amounts of time;
    calculating an actual frequency of an engine speed;
    calculating an actual frequency of a speed of the vehicle;
    reading a plurality of outputs corresponding to actual operating conditions of the vehicle;
    determining an actual gear ratio of the manual transmission;
    determining the actual load on the engine;
    comparing the actual frequency of the engine speed and the actual load on the engine with the stored plurality of optimum upshift conditions; and
    actuating an upshift indicating means when the comparing of the actual frequency of the engine speed and the actual load on the engine with the stored plurality of optimum upshift conditions indicates that the actual frequency of the engine speed and the actual load on the engine have been within the optimum upshift conditions for a predetermined amount of time.

10. The method of claim 9, wherein said plurality of optimum upshift conditions comprises an upshift zone formed from a relationship between the actual engine speed and a pulse width from a signal pulse for a fuel injection valve.

11. The method of claim 9, wherein said plurality of timers comprises at least one timer selected from the group consisting of: a timer which counts an amount of elapsed time from a moment when a gearshift position for said manual transmission is determined, a timer which counts an amount of elapsed time from a moment when the vehicle commences to accelerate under a large engine load, a timer which counts an amount of elapsed time from a moment when a throttle valve begins to be fully closed, a timer which counts an amount of elapsed time from a moment when an engine brake is released, a timer which counts an amount of elapsed time from a moment when a throttle valve is opened from a fully closed position, and a timer which counts an amount of elapsed time that said actual frequency of the engine speed and said actual load on the engine have been within said optimum upshift conditions for said predetermined amount of time.

12. The method of claim 9, wherein said calculating an actual frequency of the engine speed is determined by examining an interval between consecutive signal pulses being inputted to a fuel injection valve.

13. The method of claim 9, wherein said calculating an actual frequency of a speed of the vehicle is determined by counting a pulse signal from a vehicle speed sensor.

14. The method of claim 9, wherein said reading a plurality of outputs corresponding to actual operating conditions of the vehicle comprises reading at least one output selected from the group consisting of: a reversing light lamp detector, a clutch switch detector, an engine idle switch detector, a vehicle speed sensor detector and an engine coolant temperature detector.

15. The method of claim 14, wherein said plurality of outputs are inputted to an interface.

16. The method of claim 15, wherein said interface outputs a signal to a microcomputer which in turn outputs a signal to an indicator lamp when the actual frequency of the engine speed and the actual load on the engine have been within the optimum upshift conditions for a predetermined amount of time.

17. The method of claim 9, wherein said determining an actual gear ratio of the manual transmission comprises:
calculating a gear ratio from a relationship between the actual frequency of the engine speed and the actual frequency of the speed of the vehicle;
comparing the calculated gear ratio with a plurality of specific gear ratios stored in a memory means;
determining if said calculated gear ratio is within a permissible scope of said plurality of stored specific gear ratios and storing the calculated gear ratio when within said permissible scope;
determining an amount of elapsed time from a moment when the calculated gear ratio is within said permissible scope and comparing the determined amount of elapsed time with a first stored predetermined amount of time;
determining whether a throttle valve is fully closed when said determined amount of elapsed time from the moment when the calculated gear ratio is within said permissible scope is greater than said first stored predetermined amount of time;
setting a timer which counts an amount of elapsed time from a moment when the engine is released from acting as a brake, to zero;
determining an amount of elapsed time from a moment when the throttle valve is fully closed and comparing the determined amount of elapsed time from the moment when the throttle valve is fully closed with a second stored predetermined amount of time; and
outputting a value resulting in an engine brake flag being set when said determined amount of elapsed time from the moment when the throttle valve is fully closed is greater than said second stored predetermined amount of time.

18. The method of claim 17, wherein when said calculated gear ratio is not within said permissible scope, said determining an actual gear ratio of the manual transmission further comprises:
setting a timer which counts an amount of elapsed time from a moment when the calculated gear ratio is within said permissible scope, to zero;
setting a timer which counts an amount of elapsed time from a moment when the throttle valve is fully closed, to zero;
storing a value indicating that said calculated gear ratio is not within said permissible scope;
comparing an amount of elapsed time from a moment when the engine is released from acting as a brake, with a third stored predetermined amount of time; and
resetting an engine brake flag when said amount of elapsed time from the moment when the engine is acting as a brake is greater than said third stored predetermined amount of time.

19. The method of claim 18, wherein said third stored predetermined amount of time is approximately equal to 0.5 seconds.

20. The method of claim 17, wherein said first stored predetermined amount of time is approximately equal to 0.1 seconds.

21. The method of claim 17, wherein said second stored predetermined amount of time is approximately equal to 0.5 seconds.

22. The method of claim 17, wherein the method further comprises:
resetting a timer which determines an amount of elapsed time from the moment when the throttle valve is fully closed, to zero, when it is determined that the throttle valve is not fully closed;
comparing an amount of elapsed time from a moment when the engine is released from acting as a brake, with a third stored predetermined amount of time; and
resetting an engine brake flag when said amount of elapsed time from the moment when the engine is acting as a brake is greater than said third stored predetermined amount of time.

23. The method of claim 9, wherein said actuating an upshift indicating means comprises:
determining if said actual frequency of the engine speed and said actual load on the engine are within said optimum upshift conditions;
determining whether a throttle valve is completely closed when said actual frequency of the engine and said actual load on the engine are within said optimum upshift conditions;
setting a first timer, which counts an amount of elapsed time that the actual frequency of the engine speed and the actual load on the engine are within said optimum upshift conditions, to zero, when the throttle valve is completely closed;
setting a second timer, which counts an amount of elapsed time from a moment when the throttle valve is opened from a fully closed position, to zero;
resetting an upshift flag;

determining whether the actual gear ratio of the manual transmission is in a highest gear ratio;

comparing a temperature of an engine coolant with a predetermined temperature when the actual gear ratio of the manual transmission is not in a highest gear ratio;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

24. The method of claim 23, wherein the method further comprises:

comparing a first stored predetermined amount of time with the amount of elapsed time that the actual frequency of the engine speed and the actual load on the engine are within said optimum upshift conditions, when the throttle valve is not completely closed;

determining whether an engine brake flag is equal to a predetermined value when the amount of elapsed time that the actual frequency of the engine speed and the actual load on the engine are within said optimum upshift conditions is greater than said first predetermined amount of time;

determining whether a width of a pulse inputted into a fuel injection valve is greater than or equal to a second stored predetermined amount of time when said engine brake flag is determined to be equal to said predetermined value;

determining whether an amount of elapsed time from a moment when the throttle valve is opened from a fully closed position is greater than or equal to a third stored predetermined amount of time, when the width of the pulse inputted into the fuel injection valve is less than said second predetermined amount of time;

setting an upshift flag when said amount of elapsed time from a moment when the throttle valve is opened from a fully closed position is greater than or equal to said third stored predetermined amount of time;

determining whether the actual gear ratio of the manual transmission is in a highest gear ratio;

comparing a temperature of an engine coolant with a predetermined temperature when the actual gear ratio of the manual transmission is not in a highest gear ratio;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

25. The method of claim 14, wherein the method further comprises:

determining whether an amount of elapsed time from a moment when the throttle valve is opened from a fully closed position is greater than or equal to a fourth stored predetermined amount of time, when the width of the pulse inputted into the fuel injection valve is greater than or equal to said second stored predetermined amount of time;

setting an upshift flag when said amount of elapsed time from a moment when the thottle valve is opened from a fully closed position is greater than or equal to said fourth stored predetermined amount of time;

determining whether the actual gear ratio of the manual transmission is in a highest gear ratio;

comparing a temperature of an engine coolant with a predetermined temperature when the actual gear ratio of the manual transmission is not in a highest gear ratio;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

26. The method of claim 25, wherein the method further comprises:

setting a timer which counts an amount of elapsed time from a moment when the engine is released from acting as a brake, to zero;

resetting an upshift flag;

determining whether the actual gear ratio of the manual transmission is in a highest gear ratio;

comparing a temperature of an engine coolant with a predetermined temperature when the actual gear ratio of the manual transmission is not in a highest gear ratio;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

27. The method of claim 25, wherein said fourth stored predetermined amount of time is approximately equal to 1.0 second.

28. The method of claim 24, wherein the method further comprises:

setting said first timer, which counts an amount of elapsed time that the actual frequency of the engine and the actual load on the engine are within said optimum upshift conditions, to zero, when the engine brake flag is not equal to said predetermined value;

setting an upshift flag;

determining whether the actual gear ratio of the manual transmission is in a highest gear ratio;

comparing a temperature of an engine coolant with a predetermined temperature when the actual gear ratio of the manual transmission is not in a highest gear ratio;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

29. The method of claim 24, wherein the method further comprises:

setting the second timer, which counts an amount of elapsed time from the moment when the throttle valve is open from a fully closed position, to zero, when said amount of elapsed time that said actual frequency of the engine speed and said actual load on the engine are within said optimum upshift conditions, is less than said first stored predetermined amount of time;

resetting an upshift flag;

determining whether the actual gear ratio of the manual transmission is in a highest gear ratio;

comparing a temperature of an engine coolant with a predetermined temperature when the actual gear ratio of the manual transmission is not in a highest gear ratio;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

30. The method of claim 24, wherein said first stored predetermined amount of time is approximately equal to 0.2 seconds.

31. The method of claim 24, wherein said second stored predetermined amount of time is approximately equal to 1.6 milliseconds.

32. The method of claim 24, wherein said third stored predetermined amount of time is approximately equal to 2.0 seconds.

33. The method of claim 23, wherein no instruction to upshift is given when the actual gear ratio of the manual transmission is in the highest gear ratio.

34. The method of claim 23, wherein no instruction to upshift is given when said temperature of the engine coolant is less than said predetermined temperature.

35. The method of claim 23, wherein no instruction to upshift is given when speed speed of the vehicle is less than or equal to said predetermined vehicle speed.

36. The method of claim 9, wherein said actuating an upshift indicating means comprises:

determining if said actual frequency of the engine speed and said actual load on the engine are within said optimum upshift conditions;

setting a first timer, which counts an amount of elapsed time that the actual frequency of the engine speed and the actual load on the engine are within said optimum upshift conditions, to zero, when it is determined that said actual frequency of the engine speed and said actual load on the engine are not within said optimum upshift conditions;

setting a second timer, which counts an amount of elapsed time from a moment when the throttle valve is opened from a fully closed position, to zero;

resetting an upshift flag;

determining whether the actual gear ratio of the manual transmission is in a highest gear ratio;

comparing a temperature of an engine coolant with a predetermined temperature when said actual gear ratio of the manual transmission is not in said highest gear ratio;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

37. The method of claim 9, wherein said determining an actual gear ratio of the manual transmission comprises:

calculating a gear ratio from a relationship between the actual frequency of the engine speed and the actual frequency of the speed of the vehicle;

comparing the calculated gear ratio with a plurality of specific gear ratios stored in a memory means;

determining if said calculated gear ratio is within a permissible scope of said plurality of stored specific gear ratios and storing the calculated gear ratio when within said permissible scope;

determining an amount of elapsed time from a moment when the calculated gear ratio is within said permissible scope and comparing the determined amount of elapsed time with a first stored predetermined amount of time;

determining whether a width of a pulse inputted into a fuel injection valve is greater than or equal to a predetermined value when said determined amount of elapsed time from the moment when the calculated gear ratio is within said permissible scope is greater than said first stored predetermined amount of time;

setting a timer which counts an amount of elapsed time from a moment when the engine is released from acting as a brake, to zero;

determining an amount of elapsed time from a moment when the vehicle begins to accelerate under a large engine load and comparing the determined amount of elapsed time from the moment when the vehicle begins to accelerate with a second stored predetermined amount of time; and outputting a value corresponding to an acceleration flag being set when said determined amount of elapsed time when the moment when the vehicle begins to accelerate under a large engine load is greater than said second stored predetermined amount of time.

38. The method of claim 37, wherein when said calculated gear ratio is not within said permissible scope, said determining an actual gear ratio of the manual transmission further comprises:

setting a timer which counts an amount of elapsed time from a moment when the calculated gear ratio is within said permissible scope, to zero;

setting a timer which counts an amount of elapsed time from a moment when the vehicle begins to accelerate under a large engine load, to zero;

storing a value indicating that said calculated gear ratio is not within said permissible scope;

comparing an amount of elapsed time from a moment when the engine is acting as a brake with a third stored predetermined amount of time; and resetting an acceleration flag when said amount of elapsed time from the moment when the engine is acting as a brake is greater than said third stored predetermined amount of time.

39. The method of claim 38, wherein said third stored predetermined amount of time is approximately equal to 0.5 seconds.

40. The method of claim 37, wherein said first stored predetermined amount of time is approximately equal to 0.1 seconds.

41. The method of claim 37, wherein said second stored predetermined amount of time is approximately equal to 1.0 second.

42. The method of claim 37, wherein the method further comprises:

resetting a timer which determines an amount of elapsed time from the moment when the throttle valve is fully closed, to zero, when it is determined that the throttle valve is not fully closed;

comparing an amount of elapsed time from a moment when the engine is released from acting as a brake, with a third stored predetermined amount of time; and resetting an engine brake flag when said amount of elapsed time from the moment when the engine is acting as a brake is greater than said third stored predetermined amount of time.

43. The method of claim 9, wherein said actuating an upshift indicating means comprises:

determining if said actual frequency of the engine speed and said actual load on the engine are within said optimum upshift conditions;

setting a first timer, which counts an amount of elapsed time that the actual frequency of the engine speed and the actual load on the engine are within said optimum upshift conditions, to zero, when it is determined that said actual frequency of the engine speed and said actual load on the engine are not within said optimum upshift conditions;

setting a second timer, which counts an amount of elapsed time from a moment when the throttle valve is opened from a fully closed position, to zero;

resetting an upshift flag;

determining whether the actual gear ratio of the manual transmission is in a highest gear ratio;

determining whether a throttle valve is completely closed, when said actual gear ratio of the manual transmission is not in said highest gear ratio;

comparing a temperature of an engine coolant with a predetermined temperature when the throttle valve is not completely closed;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

44. The method of claim 43, whrein the method further comprises:

comparing a first stored predetermined amount of time with an amount of elapsed time that the actual frequency of the engine speed and the actual load on the engine are within said optimum upshift conditions, when it is determined that said actual frequency of the engine speed and said actual load on the engine are within said optimum upshift conditions;

determining whether an acceleration flag is equal to a predetermined value when the amount of elapsed time that the actual frequency of the engine speed and the actual load on the engine are within said optimum upshift conditions is greater than said first stored predetermined amount of time;

determining whether a width of a pulse inputted into a fuel injection valve is less than or equal to a second stored predetermined amount of time when said acceleration flag is determined to be equal to said predetermined value;

determining whether an amount of elapsed time from a moment when the throttle valve is opened from a fully closed position is greater than or equal to a third stored predetermined amount of time, when the width of the pulse inputted into the fuel injection valve is greater than said second predetermined amount of time;

setting an upshift flag when said amount of elapsed time from a moment when the throttle valve is opened from a fully closed position is greater than or equal to said third stored predetermined amount of time;

determining whether the actual gear ratio of the manual transmission is in a highest gear ratio;

determining whether a throttle valve is completely closed, when said actual gear ratio of the manual transmission is not in said highest gear ratio;

comparing a temperature of an engine coolant with a predetermined temperature when the throttle valve is not completely closed;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

45. The method of claim 44, wherein the method further comprises:

determining whether an amount of elapsed time from a moment when the throttle valve is opened from a fully closed position is greater than or equal to a fourth stored predetermined amount of time, when the width of the pulse inputted into the fuel injection valve is less than or equal to said second stored predetermined amount of time;

setting an upshift flag when said amount of elapsed time from a moment when the throttle valve is opened from a fully closed position is greater than or equal to said fourth stored predetermined amount of time;

determining whether the actual gear ratio of the manual transmission is in a highest gear ratio;

determining whether a throttle valve is completely closed, when said actual gear ratio of the manual transmission is not in said highest gear ratio;

comparing a temperature of an engine coolant with a predetermined temperature when the throttle valve is not completely closed;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

46. The method of claim 45, wherein the method further comprises:

setting a timer which counts an amount of elapsed time from a moment when the engine is released from acting as a brake, to zero;

resetting an upshift flag;

determining whether the actual gear ratio of the manual transmission is in a highest gear ratio;

determining whether a throttle valve is completely closed, when said actual gear ratio of the manual transmission is not in said highest gear ratio;

comparing a temperature of an engine coolant with a predetermined temperature when the throttle valve is not completely closed;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

47. The method of claim 45, wherein said fourth stored predetermined amount of time is approximately equal to 1.0 second.

48. The method of claim 44, wherein the method further comprises:

setting said first timer, which counts an amount of elapsed time that the actual frequency of the engine and the actual load on the engine are within said optimum upshift conditions, to zero, when the acceleration flag is not equal to said predetermined value;

setting an upshift flag;

determining whether the actual gear ratio of the manual transmission is in a highest gear ratio;

determining whether a throttle valve is completely closed, when said actual gear ratio of the manual transmission is not in said highest gear ratio;

comparing a temperature of an engine coolant with a predetermined temperature when the throttle valve is not completely closed;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

49. The method of claim 44, wherein the method further comprises:

setting the second timer, which counts an amount of elapsed time from a moment when the throttle valve is opened from a fully closed position, to zero, when said amount of elapsed time that said actual frequency of the engine speed and said actual load on the engine are within said optimum upshift conditions is less than said first stored predetermined amount of time;

resetting an upshift flag;

determining whether the actual gear ratio of the manual transmission is in a highest gear ratio;

determining whether a throttle valve is completely closed, when said actual gear ratio of the manual transmission is not in said highest gear ratio;

comparing a temperature of an engine coolant with a predetermined temperature when the throttle valve is not completely closed;

comparing a speed of the vehicle with a predetermined vehicle speed when the detected temperature of the engine coolant is greater than or equal to said predetermined temperature; and outputting an instruction to upshift the manual transmission when the speed of the vehicle is greater than said predetermined vehicle speed.

50. The method of claim 44, wherein said first stored predetermined amount of time is approximately equal to 0.2 seconds.

51. The method of claim 44, wherein said second stored predetermined amount of time is approximately 1.6 milliseconds.

52. The method of claim 44, wherein said third stored predetermined amount of time is approximately equal to 2.0 seconds.

53. The method of claim 44, wherein no instruction to upshift is given when the actual gear ratio of the manual transmission is in the highest gear ratio.

54. The method of claim 44, wherein no instruction to upshift is given when said throttle valve is fully closed.

55. The method of claim 44, wherein no instruction to upshift is given when said temperature of the engine coolant is less than said predetermined temperature.

56. The method of claim 44, wherein no instruction to upshift is given when said speed of the vehicle is less than or equal to said predetermined vehicle speed.

* * * * *